No. 787,458. Patented April 18, 1905.

UNITED STATES PATENT OFFICE.

FREDERICK W. MEEKER, OF RYE, NEW YORK.

ARTIFICIAL FUEL AND PROCESS OF MAKING SAME.

SPECIFICATION forming part of Letters Patent No. 787,458, dated April 18, 1905.

Application filed September 15, 1904. Serial No. 224,526.

*To all whom it may concern:*

Be it known that I, FREDERICK W. MEEKER, a citizen of the United States, residing in the town of Rye, Westchester county, State of New York, have invented a new and useful Improvement in Artificial Fuels and the Process of Making the Same; and I do hereby declare the following to be a full, clear, and exact description of the invention, such as will enable others skilled in the art to which it appertains to make and use the same.

This invention relates to composite or artificial fuel or the making of briquets from anthracite or bituminous coal or from lignite or peat.

The object of my invention is to produce a briquet of carbonaceous matter which will equal in heating effect the best anthracite coal and at the same time kindle more readily and burn freely without smoke, that will not disintegrate in the fire while burning and shall be strongly adherent and hard enough to stand handling and transportation without undue loss from abrasion, and, finally, that the briquets shall be commercially waterproof—that is, that they shall stand all exposure to weather without disintegrating or loss of combustible properties.

In carrying my invention into effect I first prepare a paste which is to form the base of the binder. This paste may be made from a number of materials—such as flours from wheat, rye, oats, or any of the cereals, or from glue, dextrin, or casein, or from any combination of them—which when heated with water will form a paste or adhesive mass. A paste which I have used with good results is composed of wheat-flour and hide-glue—about eighteen pounds of flour and three pounds of glue to two hundred and forty pounds of water, the mixture boiled for ten minutes in a steam-jacketed paste-making machine of any of the well-known makes. To this paste or base is added and thoroughly incorporated three pounds of pigment or powder having the properties of a paint pigment or filler, such as oxid of iron or black oxid of manganese or lampblack. The chemical nature of this filler is not important provided it possesses that well-recognized character of a pigment or paint-filler which when subsequently separated from the liquid or conveyer leaves a surface offering great resistance to disintegration when exposed. I find that the pigment or filler used as specified materially adds to the strength of the briquet. An additional advantage of the introduction of the substance which I have described as a "pigment" is that by reason of its very finely divided condition it serves to fill the ultimate voids in the briquets, especially when made from graded particles, as hereinafter described. I then prepare a mixture of fine anthracite coal of different grades of fineness and bituminous dust or slack. The proportions of the various grades of the anthracite coal are such as to produce the most compact or solid mass—that is, a mass containing the least proportion of void or open spaces between particles. These proportions I have found to be as follows, commencing with the largest particles of coal which are now rejected as too small for commercial use, such as readily pass through a screen of four meshes to the square inch: Of this size I use fifty per cent. To fill the larger voids of this size, I use about thirty per cent. of a size that will just be retained in a screen of twelve meshes to the square inch. To partly fill again the remaining voids, I use about fifteen per cent. of a size that will just be retained in a screen of thirty meshes to the square inch, and to fill the remaining voids I use five per cent. of a size that will pass through a screen of fifty meshes to the square inch. These are proportions which I have used with very satisfactory results; but I do not confine myself to these exact proportions, as I have discovered that by varying the proportions of large and small particles and very fine material it is possible to control to a considerable extent the rapidity of combustion, the briquets made with the larger proportion of large particles consuming more rapidly under the same conditions. In this manner I obtain a very solid and dense mass and reduce the voids to be filled by the liquid binding material to a minimum.

To the above mixture of coal, before the addition of the agglutinant or binder, is added and incorporated a finely-powdered gum or pitch, such as resin or pitch, in the proportion of fifty pounds to two thousand pounds of the coal. The essential properties of this ingredient are that it shall not be soluble in water, that it shall not vaporize below the evaporating temperature of water, and that it shall vaporize at a readily-attainable temperature above the vaporizing temperature of water.

To the coal mixture prepared as above I now add the binder in the proportion of two hundred and twenty-four pounds of binder to two thousand pounds of coal compound and thoroughly incorporate in a suitable mechanical mixing device. The fuel compound prepared as above is then formed into briquets by any suitable press giving a pressure of about two thousand pounds to the square inch, which will compact the mass, eliminating all voids, and bringing the specific gravity of the briquets almost to that of a solid piece of anthracite coal.

In certain mixtures, particularly where the fuel contains a proportion of water amounting to about ten per cent., I have been able to cause the briquets to adhere by compression alone without the use of a binder. When these briquets are heated, as described below, so that the resin is thoroughly diffused through the mass, they are strongly adherent. The difficulty has been, however, when the soluble binder or agglutinant is omitted in handling the briquets after they are taken from the press and while putting them into the dry room or kiln, a considerable proportion of them being broken during this handling.

Upon coming from the press the briquets are introduced into a dry-room, where the temperature is gradually raised to about 212° Fahrenheit, or just high enough to drive off the water used in the binder or that found in the coal dust and slack as commercially used. When all the moisture has been removed, the temperature is raised to the vaporizing-point of the waterproofing gum or pitch which was used, and this ingredient is diffused throughout the briquet. In the case of resin, which I prefer to use, this temperature is about 280° Fahrenheit. After cooling it is found in a film or coating over the surface of the briquet, rendering it practically waterproof and weatherproof and greatly increasing its resisting properties.

When cool, the briquet can be handled and stored the same as anthracite coal.

I do not restrict my invention to the exact proportions of the ingredients named, as they can be varied without departing from the spirit of my invention. A richer paste can be used or a larger proportion of gum or resin to increase the strength and weather-resisting properties of the briquet.

By the term "resin," and a fortiori by the phrase "substance exemplified by resin," I include any gum or other material possessing binding and waterproofing qualities insoluble in water and melting at an easily-attainable temperature not substantially less than that of boiling water.

By the phrase "strongly adherent" as used in the claims I include an adhesion substantially like that produced by the process above described, in which the mingled coal particles and resin are after molding first heated to a temperature sufficient to drive off the water and afterward to a temperature at which the resin is melted and diffused throughout the mass.

What I claim as new, and desire to secure by Letters Patent, is—

1. The process of making artificial fuel comprising: mixing comminuted fuel with a substance exemplified by resin; molding the mass into briquets; artificially heating the briquets to a temperature below the melting-point of the resin and for the time required to dry the briquets; and afterward heating the briquets to the temperature required to melt the resin and holding them at such temperature for the time required to diffuse the resin throughout the briquet.

2. The process of manufacturing artificial fuel comprising: mixing comminuted fuel with a binder and also with a substance exemplified by resin; molding the mass into briquets; artificially heating the briquets to a temperature below the melting-point of the resin and for the time required to dry the briquets; and afterward heating the briquets to the temperature required to melt the resin and holding them at such temperature for the time required to diffuse the resin throughout the briquet.

3. The process of manufacturing artificial fuel comprising: mixing comminuted fuel with a binder containing a pigment and also with a substance exemplified by resin; molding the mass into briquets; artificially heating the briquets to a temperature below the melting-point of the resin and for the time required to dry the briquets; and afterward heating the briquets to the temperature required to melt the resin and holding them at such temperature for the time required to diffuse the resin throughout the briquet.

4. The process of manufacturing artificial fuel comprising: mixing comminuted fuel with a substance exemplified by resin; molding the mass into briquets; compressing the briquets under a high pressure; artificially heating the briquets to a temperature below the melting-point of the resin and for the time required to dry the briquets; and afterward heating the briquets to the temperature required to melt the resin and holding them at such temperature for the time required to diffuse the resin throughout the briquet.

5. The process of manufacturing artificial fuel comprising: grading particles of coal into a plurality of sizes such that when compressed together they will form a mass approximately free from voids; mixing the coal particles with a substance exemplified by resin; molding the mass into briquets; artificially heating the briquets to a temperature below the melting-point of the resin and for the time required to dry the briquets; and afterward heating the briquets to the temperature required to melt the resin and holding them at such temperature for the time required to diffuse the resin throughout the briquet.

6. The process of manufacturing artificial fuel comprising: mixing comminuted anthracite and bituminous coal with a substance exemplified by resin; molding the mass into briquets; artificially heating the briquets to a temperature below the melting-point of the resin and for the time required to dry the briquets; and afterward heating the briquets to the temperature required to melt the resin and holding them at such temperature for the time required to diffuse the resin throughout the briquet.

7. A compressed, strongly-adherent, approximately anhydrous briquet of artificial fuel consisting of comminuted coal and a substance exemplified by resin diffused therethrough.

8. A compressed, strongly-adherent, approximately anhydrous briquet of artificial fuel consisting of comminuted coal, a soluble agglutinant, and a substance exemplified by resin diffused therethrough.

9. A compressed, strongly-adherent, approximately anhydrous briquet of artificial fuel consisting of comminuted coal, a soluble agglutinant, a pigment, and a substance exemplified by resin diffused therethrough.

10. A compressed, strongly-adherent briquet of artificial fuel of approximately maximum density consisting of comminuted coal, the particles of which are graded in size, and a waterproofing material diffused therethrough.

11. A compressed, strongly-adherent briquet of artificial fuel of approximately maximum density consisting of comminuted coal, the particles of which are graded in size, and a substance exemplified by resin diffused therethrough.

12. A compressed, strongly-adherent briquet of artificial fuel of approximately maximum density consisting of comminuted coal, the particles of which are graded in size, a soluble agglutinant, and a waterproof coating.

13. A compressed, strongly-adherent briquet of artificial fuel of approximately maximum density consisting of comminuted coal, the particles of which are graded in size, a soluble agglutinant, a pigment, and a waterproof coating.

14. The process of making artificial fuel comprising: mixing comminuted fuel with a substance exemplified by resin; molding the mass into briquets; artificially heating the briquets to a temperature below the melting-point of the resin and for the time required to dry the briquets; and afterward heating the briquets to the temperature required to liquefy and partially vaporize the resin and holding them at such temperature for the time required to diffuse the resin throughout the briquet.

15. The process of manufacturing artificial fuel comprising: mixing comminuted fuel with a binder and also with a substance exemplified by resin; molding the mass into briquets; artificially heating the briquets to a temperature below the melting-point of the resin and for the time required to dry the briquets; and afterward heating the briquets to the temperature required to liquefy and partially vaporize the resin and holding them at such temperature for the time required to diffuse the resin throughout the briquet.

16. The process of manufacturing artificial fuel comprising: mixing comminuted fuel with a binder containing a pigment and also with a substance exemplified by resin; molding the mass into briquets; artificially heating the briquets to a temperature below the melting-point of the resin and for the time required to dry the briquets; and afterward heating the briquets to the temperature required to liquefy and partially vaporize the resin and holding them at such temperature for the time required to diffuse the resin throughout the briquet.

17. The process of manufacturing artificial fuel comprising: mixing comminuted fuel with a substance exemplified by resin; molding the mass into briquets; compressing the briquets under a high pressure; artificially heating the briquets to a temperature below the melting-point of the resin and for the time required to dry the briquets; and afterward heating the briquets to the temperature required to liquefy and partially vaporize the resin and holding them at such temperature for the time required to diffuse the resin throughout the briquet.

18. The process of manufacturing artificial fuel comprising: grading particles of coal into a plurality of sizes such that when compressed together they will form a mass approximately free from voids; mixing the coal particles with a substance exemplified by resin; molding the mass into briquets; artificially heating the briquets to a temperature below the melting-point of the resin and for the time required to dry the briquets; and afterward heating the briquets to the temperature required to liquefy and partially vaporize the resin and holding them at such temperature for the time required to diffuse the resin throughout the briquet.

19. The process of manufacturing artificial fuel comprising: mixing comminuted anthracite and bituminous coal with a substance exemplified by resin; molding the mass into briquets; artificially heating the briquets to a temperature below the melting-point of the resin and for the time required to dry the briquets; and afterward heating the briquets to the temperature required to liquefy and partially vaporize the resin and holding them at such temperature for the time required to diffuse the resin throughout the briquet.

In testimony whereof I affix my signature in the presence of two witnesses.

FREDERICK W. MEEKER.

Witnesses:
GEORGE W. HARPER, Jr.,
HORACE D. BYRNES.